United States Patent
Hartman

(10) Patent No.: US 6,185,946 B1
(45) Date of Patent: Feb. 13, 2001

(54) SYSTEM FOR SEQUENCING CHILLERS IN A LOOP COOLING PLANT AND OTHER SYSTEMS THAT EMPLOY ALL VARIABLE-SPEED UNITS

(76) Inventor: Thomas B. Hartman, 9905 39th Dr. NE., Marysville, WA (US) 98270

( * ) Notice: Under 35 U.S.C. 154(b), the term of this patent shall be extended for 0 days.

(21) Appl. No.: 09/566,681

(22) Filed: May 8, 2000

Related U.S. Application Data

(62) Division of application No. 60/133,035, filed on May 7, 1999.

(51) Int. Cl.⁷ ........................................... F25B 7/00
(52) U.S. Cl. ..................... 62/175; 62/196.2; 62/228.3; 62/228.4; 62/228.5; 62/510; 236/1 EA
(58) Field of Search .................... 62/175, 228.1, 62/228.3, 228.4, 228.5, 201, 510, 196.5, 196.3; 236/1 EA

(56) References Cited

U.S. PATENT DOCUMENTS

| | | | |
|---|---|---|---|
| 4,210,957 | 7/1980 | Spethmann | 364/105 |
| 4,463,574 | 8/1984 | Spethmann et al. | 62/175 |
| 4,483,152 | 11/1984 | Bitondo | 62/175 |
| 4,612,776 | * 9/1986 | Alsenz | 62/175 |
| 4,679,404 | * 7/1987 | Alsenz | 62/175 |
| 4,932,220 | * 6/1990 | Inoue | 62/175 |
| 4,951,475 | * 8/1990 | Alsenz | 62/117 |
| 5,050,397 | * 9/1991 | Sugiyama et al. | 62/175 |
| 5,097,670 | 3/1992 | Yoshikawa et al. | 62/99 |
| 5,222,370 | 6/1993 | James | 62/175 |
| 5,265,434 | * 11/1993 | Alsenz | 62/117 |
| 5,301,513 | 4/1994 | Duff et al. | 62/117 |
| 5,309,727 | 5/1994 | Duff et al. | 62/117 |
| 5,327,742 | 7/1994 | Duff et al. | 62/175 |
| 5,743,714 | 4/1998 | Drob | 417/2 |
| 5,743,715 | 4/1998 | Staroselsky et al. | 417/6 |
| 5,845,509 | 12/1998 | Shaw et al. | 62/175 |

* cited by examiner

Primary Examiner—William Doerrler
Assistant Examiner—Marc Norman
(74) Attorney, Agent, or Firm—Stoel Rives LLP

(57) ABSTRACT

Methods of sequencing parallel units in HVAC systems are described to improve overall system operating efficiency. The improved method is applicable for sequencing parallel centrifugal pumps in a variable flow hydronic system, parallel fans in a variable air-flow system, and centrifugal chillers in an HVAC system having a plurality of variable speed drive centrifugal chillers arrange in parallel. The method calls for determining an operating point of the on-line units, comparing the current operating point to a natural curve of maximum efficiency, and adding or shedding units as required to move closest to an operating curve of optimal efficiency, without direct regard to actual loading. Natural operating curves relate head pressure and operating speed rather than load. Control logic that implements such operating characteristics often will result in operating more parallel units on-line that would be required by prior art to meet the load. However, in such cases, all of the on-line units are operated at lower speed resulting in lower overall system energy consumption.

29 Claims, 4 Drawing Sheets

SYSTEM FOR SEQUENCING CHILLERS IN A LOOP COOLING PLANT AND OTHER SYSTEMS THAT EMPLOY ALL VARIABLE-SPEED UNITS

RELATED APPLICATION DATA

This application is a continuation of application Ser. No. 60/133,035 filed May 7, 1999.

TECHNICAL FIELD

This invention pertains to the field of heating, ventilation and air-conditioning ("HVAC") systems and, more specifically, pertains to improved strategies for sequencing parallel equipment such as centrifugal chillers, pumps and fans in order to optimize the overall operating efficiency of such systems.

BACKGROUND OF THE INVENTION

The use of compressor-based cooling plants that employ multiple machines is the most common method of providing cooling for medium and large commercial and institutional buildings and also for many industrial processes. Centrifugal chillers are usually electric driven, but may also be driven by an engine or other power source. Electric driven water chillers are used extensively in buildings, campuses and district cooling plants to provide chilled water for comfort conditioning. It is estimated by Lawrence Berkeley Laboratories that over 20% of all electric power generated in the U.S. is employed for compression-type cooling applications.

It is common to employ multiple chillers arranged in parallel as shown in FIG. 1. Similarly, the use of multiple, parallel pumps to circulate chilled or heating water in variable flow hydronic systems, and the use of multiple, parallel connected fans to provide variable airflow for comfort conditioning air in buildings is growing. This invention is directed to improved methods of sequencing multiple, parallel connected centrifugal chillers, pumps or fans in systems that employ variable speed operation of the units in such a system. Hereinafter, the term "unit" is used to refer to a chiller, pump or fan as the context may require. The term "sequencing" refers to activating or bringing on-line parallel units in a system, and conversely, deactivating or taking parallel units off-line in an HVAC system.

The present invention will be described and illustrated as applied in the context of centrifugal type water chillers which are the least costly and most efficient type of large chiller. Centrifugal chillers are the most commonly employed refrigeration machine type for larger comfort cooling applications and have been employed for in this role for over 75 years. The invention is not limited to such applications, however, as further explained later. For example, it can be advantageously applied to variable-flow pumping applications where multiple variable-speed drive centrifugal pumps are deployed in parallel, such as for pumping heating or cooling fluids from a header to the loads.

Chilled water plants typically include multiple chillers. This permits staging equipment to meet the changing loads, which usually vary from 0% to 100% of maximum load depending on weather or process requirements. Multiple units also permit fail safe operation with backup available in case of a failure of one of the machines. FIG. 1 illustrates the major components of a conventional water chiller plant with four water-cooled chillers. Chiller plants typically employ two to as many as a dozen or more chillers for comfort conditioning applications or to serve process cooling needs in a manufacturing application. In a typical water chillers plant, each chiller has a motor/compressor unit (109$a$–$d$), which may be a hermetic type or open type. The motor or engine drives the corresponding compressor. Each compressor draws low pressure refrigerant gas from the corresponding cooler (11$a$–$d$), compresses it, and discharges it as a higher pressure hot gas into the condenser (112$a$–$d$). In the condenser, hot gaseous refrigerant is condensed into a liquid by rejecting heat to tepid water from a cooling tower which cools the water by a combination of heat and mass transfer. In the towers, distribution nozzles (122$a$–$d$) spread the water over tower fill (123$a$–$d$) to enhance cooling by evaporation. A fan in each tower (124$a$–$d$), driven by a motor (125$a$–$d$), directs air through the water as it cascades through the fill to the tower basin (126$a$–$d$). The water is cooled by the evaporation process that occurs as it falls through the tower fill. The cooler water in the tower basins is circulated through the chiller condensers to condense the hot refrigerant and then back to the cooling towers distribution nozzles by condenser water pumps (120$a$–$d$).

The condensed liquid refrigerant flows through an expansion device in each chiller (133$a$–$d$) that regulates the flow of refrigerant into each cooler (111$a$–$d$), which are held at a low pressure by the operation of the compressor. The low pressure environment causes the refrigerant to change state to a gas and as it does so, it absorbs the required heat of vaporization from the chilled water circulating through the cooler due to operation of chilled water pumps (140$a$–$d$). The low pressure vapor is drawn into the inlet of the compressor and the cycle is continuously repeated. The chilled water is circulated to a distribution header (181) where it is delivered to the cooling loads served by the plant and is return from those loads into a return header (182) for circulation through the on-line chiller(s) again. Though the configuration of many chilled water plants is similar to that shown in FIG. 1, there are many variations to this basic design.

Because all cooling plants that provide chilled water for comfort conditioning and most plants that provide process cooling are subject to wide variations in cooling load size, some method of modulating the capacity of the chiller plant is necessary. In the prior art, this is accomplished by sequencing equipment based on the load being served such that a minimum amount of equipment operates at all times, sufficient to meet the current load, and the equipment that remains operational, i.e. the units "on-line," are operated at as close to full capacity as possible. Thus, as the load served by the plant increases, additional chillers, along with their associated pumps and fans are started.

It is generally known and accepted in this field that the cooling load should be distributed evenly among the operating chillers. A common strategy for sequencing chillers, in other words, making the determination of when to activate another chiller, or conversely when to deactivate a chiller, is typically accomplished by the "capacity" method in which additional chillers are sequenced on when the operating units have insufficient capacity to meet the current load, and chillers are sequenced off (called "shedding") when the current load can be met with one fewer machines operating. A description of chiller shedding based on the capacity method is disclosed in U.S. Pat. No. 5,222,370. Capacity based sequencing approaches in which chiller capacity and or sequencing is adjusted using current head pressure or condensing temperature are disclosed in U.S. Pat. Nos. 4,210,957 and 4,463,574. Another known approach for chiller sequencing, one specifically for chiller plants that incorporate equipment of different efficiencies, in which chillers staging is adjusted based on capacity and relative efficiency using a predetermined matrix is disclosed in U.S. Pat. No. 4,483,152. Another example of capacity control integrated with capacity-based sequencing for a system employing variable speed chillers is disclosed in U.S. Pat. No. 5,097,670. Although the means to calculate current capacity and required capacity vary, and the selection of chillers to add or shed may be based on efficiency of individual units at that operating point, all of these prior art techniques employ sequencing of equipment on or off line based on the capacity of the various equipment such that the on-line equipment is operated as near as possible to full capacity, and equipment is sequenced off line when the current equipment has sufficient excess capacity such that the load can be met with at least one less piece of equipment on-line. Some find it intuitive that operating each unit at or near its full capacity will lead to efficient operation of the overall system.

Similarly, air and water distribution systems that employ multiple centrifugal pumps and fans are also sequenced on and off line in response to loading (capacity) only. Accordingly, a pump or fan is added when the units currently on-line lack sufficient capacity to meet the current load conditions, and a pump or fan is sequenced off line with the on-line units are determined to have sufficient capacity with one fewer units on-line.

Many manufacturers of chillers now make centrifugal chillers with an option for variable speed drive operation. Nonetheless, the present state of the art is to sequence variable speed chillers using methods that are the same as or very similar to the capacity methods described above, i.e. those that are used in plants that employ conventional constant speed equipment. The use of variable speed drives for condenser pumps is presently discouraged by chiller manufacturers because of the perceived difficulty in controlling the speed of such pumps adequately. However, I describe stable methods for operation of variable flow chilled water cooling systems in my U.S. Pat. No. 5,946,926 incorporated herein by this reference. I believe that systems using variable speed drives for chilled water pumps, condenser pumps and cooling tower fans are likely to become increasingly popular in the future because of various advantages, the most important being the opportunities for improved operating efficiency as described below. Such all-variable speed plants are commonly called "LOOP" chiller plant configurations.

As noted, it is generally assumed that chillers and other refrigeration equipment operate most efficiently when operating at or very near full load conditions. This widely accepted design principle is reinforced by the fact that ancillary equipment such as chilled and/or condenser water pumps in conventional constant speed chiller plants are also constant speed and use the same energy at all chiller loads. This and the fact that centrifugal chiller compressors are typically selected for peak efficiency at design conditions makes it appear that efficiency will be lost if such chillers are operated at loads below their rated maximum capacity. I have re-examined these assumptions and discovered a new strategy for sequencing HVAC equipment that provides substantial improvements in operating efficiencies, notwithstanding that it runs counter to conventional wisdom and perhaps intuition as well.

SUMMARY OF THE INVENTION

The present invention is directed to methods of sequencing centrifugal chillers, pumps or fans in systems that employ multiple such units in parallel and in which such units are operated with variable speed drives. This invention discloses a method for sequencing the chillers, pumps or fans in order to optimize the overall operating efficiency of such systems. FIG. 1 is a simplified schematic diagram of a conventional centrifugal chiller plant that provides chilled water for comfort cooling in buildings or for process cooling. This type of system employs multiple (here four) water cooled liquid chillers of the type commonly employed for comfort conditioning or process load cooling, and includes an evaporative type cooling tower for each chiller. The configuration was described above. Referring now to FIG. 2, a similar chiller plant is shown. The primary difference between the systems of FIGS. 1 and 2 is that the latter has variable-speed drives coupled to each unit as further described below. The present invention provides a new method of sequencing chillers when they are installed in an all-variable speed LOOP chiller plant configuration such as that shown in FIG. 2.

Briefly, the present invention provides new techniques for sequencing chillers, pumps, fans and other centrifugal HVAC equipment where multiple units are configured in parallel, such that the total energy use for the chillers and heat rejection systems is continuously optimized. Chillers are sequenced on and off not based on capacity, but to keep the on-line equipment operating at all times as close as possible to the "natural curve" of that equipment, which is the point of highest operating efficiency at the load condition. With the Natural Curve method of sequencing chillers in an all-variable speed chiller plant, known as a LOOP chiller plant, chillers are sequenced when the marginal energy use of the chillers is minimized by adding or subtracting a chiller at that point. The same strategy can be applied to pumps and fans in HVAC systems as well.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1:
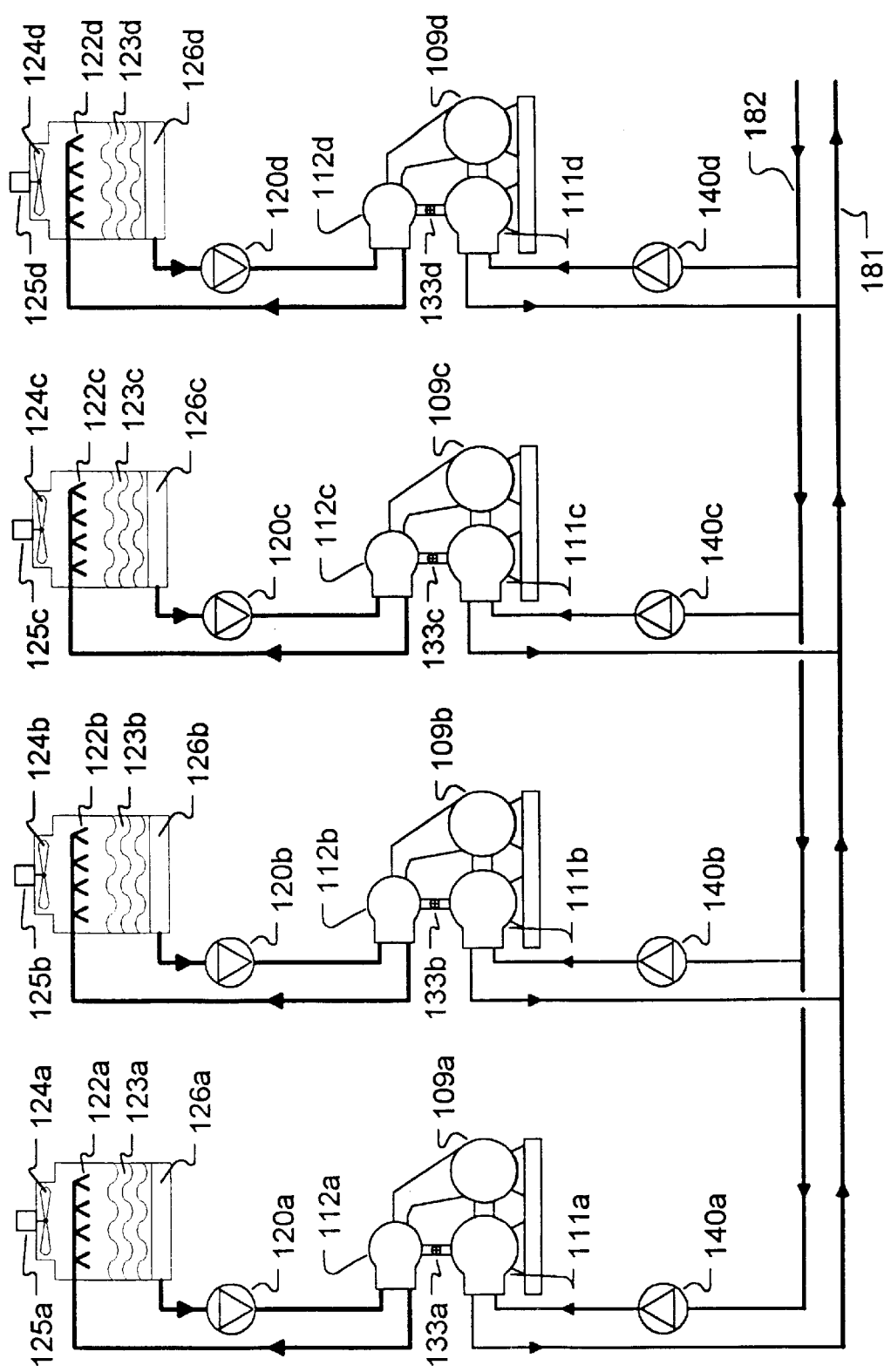
FIG. 1 is a schematic of a conventional centrifugal chiller plant that provides chilled water for comfort cooling in buildings or for process cooling.
Figure 2:
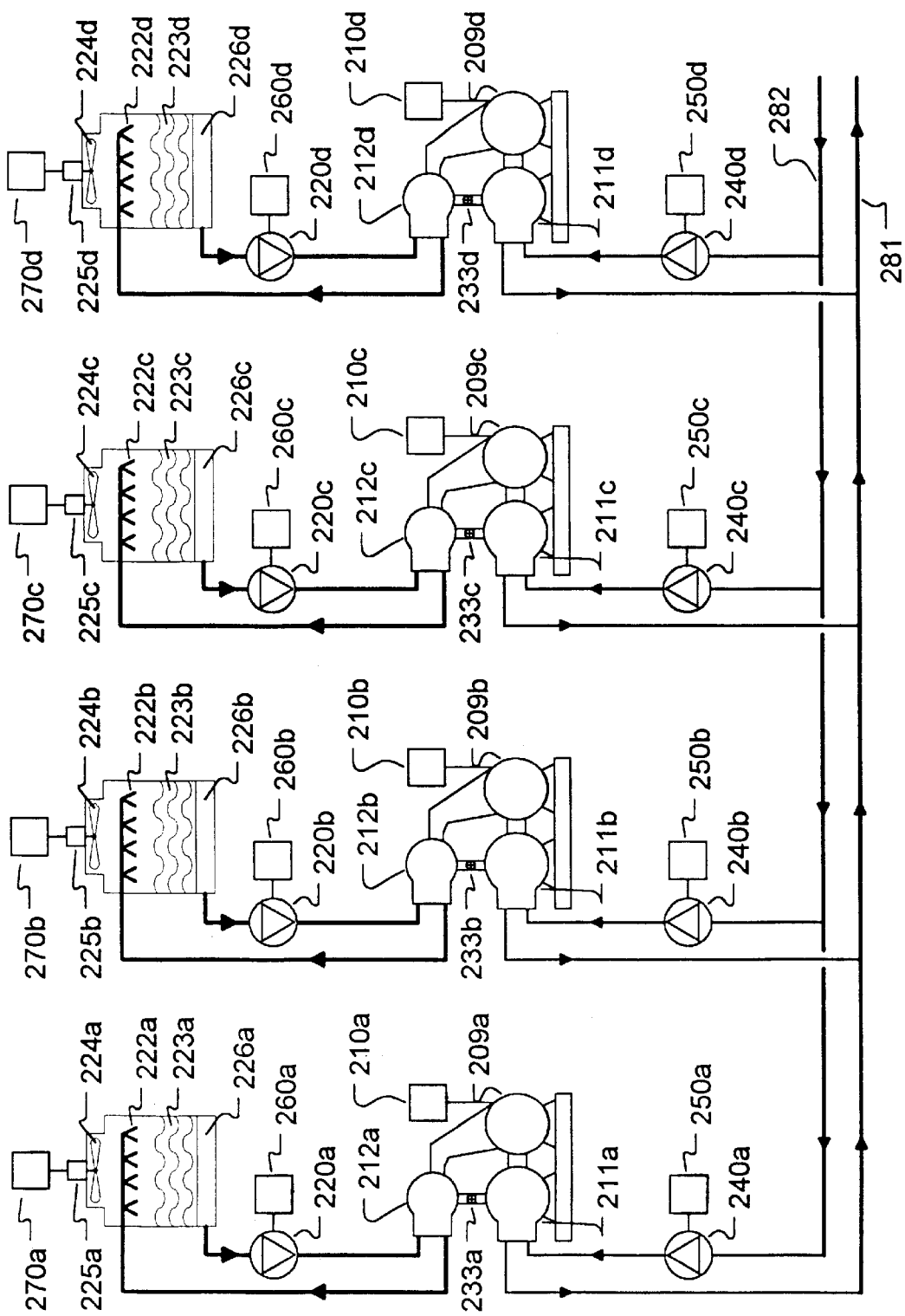
FIG. 2 is a schematic of an all variable speed LOOP chiller plant in which the variable speed water cooled liquid chillers employ variable speed chilled water pumps, variable speed condenser pumps and variable speed cooling tower fans.

An all variable-speed LOOP type chiller plant is illustrated in FIG. 2. Note that FIG. 2 is similar to FIG. 1 except that each chiller is driven (in FIG. 2) by a variable-speed drive (210a–d), each chilled water pump is driven by a variable-speed drive (250a–d), each condenser pump is driven by a variable-speed drive (260a–d) and each cooling tower fan is driven by a variable-speed drive (270a–d), respectively. Aside from these differences, all the equipment and processes are the same as those in FIG. 1. Methods of coordination of the chilled water pumps, condenser water pumps, and tower fans, with the chiller operation in an all variable-speed LOOP chiller plant are the subject of other patents and patent applications and are not directly relevant to this invention. The present invention is focused on sequencing of equipment.

As mentioned earlier, conventional design teaches that the chiller systems a, b, c and d in FIG. 2 can be sequenced on and off line in accordance with various procedures that match the capacity of the chillers to the load being served. However, in a variable-speed LOOP chiller plant where operating efficiency can increase at part load conditions, this is not the most efficient means to sequence the chillers on an off line. Each chiller's variable-speed compressor has a natural curve of highest efficiency wherein the highest compressor efficiency at any speed occurs generally when the ratio of head pressure on the chiller to design (maximum) head pressure is equal to the square of the ratio of the present speed to maximum speed. According to this relationship, whenever the actual head pressure of the on-line chillers is above this optimum level at a given speed, efficiency can be improved if the number of chillers on-line is reduced, and the remaining chillers operated at higher speeds. Conversely, any time the compressor head pressure is below this optimum level at a given speed, efficiency can be improved by increasing the number of chillers on-line and operating the chillers at a lower speed. These relationships are shown in FIG. 3.

Figure 3:
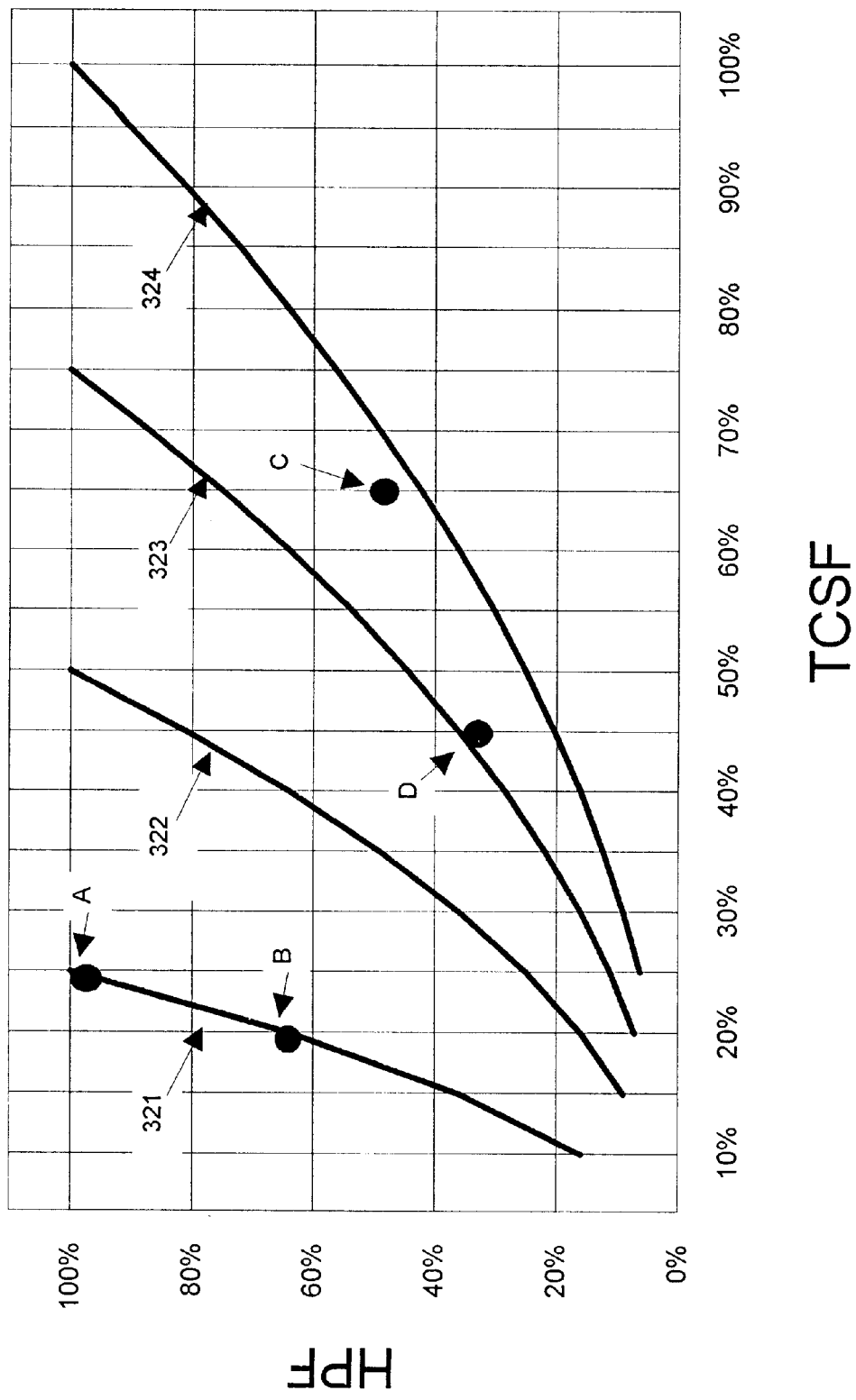
FIG. 3 illustrates an example of "natural curves" for a chiller plant employing four variable speed centrifugal chillers, all with the same capacity and part load performance characteristics.

FIG. 3 illustrates the "natural" curves for an all-variable-speed LOOP centrifugal chiller plant similar to that configured in FIG. 2. Efficiency curves of the type illustrated in FIG. 3 can also be created and applied to centrifugal pumps or fans in systems that employ multiple variable-speed units to meet varying flow requirements. In FIG. 3, all chillers are the same size and have the same performance characteristics, and all on-line chillers are operated at identical compressor speeds. These criteria are recommended for effective and simple LOOP plant operation, but variations can be accommodated without departing from the scope of the present invention by modifying the curves to reflect those variations. In FIG. 3, curve 321 shows the natural curve for a single on-line chiller. The y-axis indicates percent of design maximum compressor head (generally the difference between the discharge pressure and suction pressure of the compressor), labeled "HPF" for Head Pressure Fraction.

The x-axis corresponds to Total Chiller Speed Factor (TCSF), where TCSF is determined by adding the percent maximum speed of all currently on-line chillers and dividing that sum by the total number of chillers in the plant. The TCSF is converted to percent in this graph. Accordingly, for a 25% TCSF to occur, for example, a single on-line chiller would be operating a full (100%) speed, two on-line chillers will be operating at 50% speed, three on-line chillers would operate at 33% speed, or all four chillers would operate at 25% speed. Note in FIG. 3, when one chiller is operating at full speed, it provides the 25% TCSF at the design maximum compressor head. This is shown as point "A." Similarly, curves 322, 323, and 324 show that TCSFs of 50%, 75% and 100% can achieve 100% compressor head with 2, 3 and all four chillers on-line and operating at full speed. With a single chiller operating at 80% speed in this four-chiller plant, the TCSF would be 20% (80% divided by 4). At a speed of 80% that compressor would operate most efficiently if the operating head of the compressor is 64% of the design maximum compressor head (0.8 squared). This point is shown in FIG. 3 as Point "B."

The form of curve 321, a curve for only a single chiller, may be supplied by the manufacturer or it can be derived from actual compressor performance data. This is the curve of compressor head that yields the highest compressor operating efficiency at various compressor speeds. If such data is not available from the manufacturer, the curve can be approximated using the centrifugal fan, pump and compressor laws which are well known and instruct that the point of highest efficiency at various speeds is occurs when the percent head pressure across the fan, pump or compressor is equal to the design maximum head pressure for the unit times the percent of maximum speed of the unit squared.

Since the preferred embodiment employs chillers that are all the same size, have the same operating characteristics, and are always operated at the same compressor speed, multiple-unit curves 322, 323, and 324 can be determined by successively adding the x-value of curve 321 to the previous curve so that curve 322 shows that with two chillers operating, the natural curve at 64% of design maximum head pressure occurs at 40% TCSF (two chillers operating at 80% speed each). With three chillers operating at 80% speed each (60% TCSF), the optimum head is 64% as shown in curve 323; and with all four chillers operating at 80% speed (80% TCSF), the optimum head is again about 64% as shown in curve 324. In this way the curves in FIG. 3 can be easily constructed. In a similar fashion, it is possible to develop curves for a plant that does not have identically sized equipment or equipment with the same performance characteristics.

Figure 4:
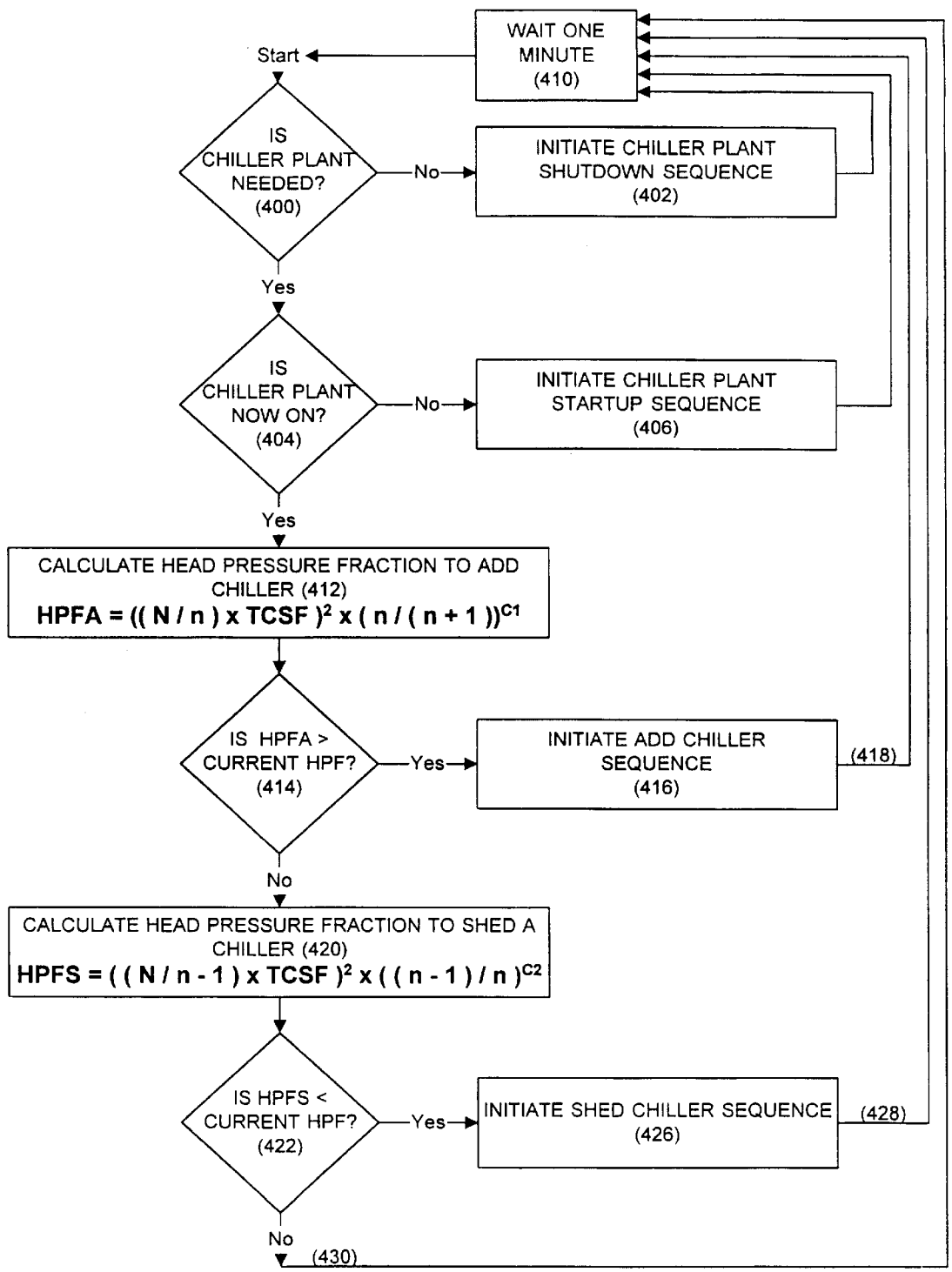
FIG. 4 is a flow chart of a sequencing control strategy for chillers in a LOOP all variable speed chiller plant operating according to this invention.

My new centrifugal chiller sequencing method is intended to be applied to an all-variable-speed LOOP chiller plant to keep chillers operating as closely as possible to one of the chiller plant's "natural" efficiency curves as shown in FIG. 3. The resulting chiller sequences are usually very different from conventional chiller operation. To illustrate, consider that the chiller plant is operating at point "C" shown in FIG. 3. Since when operating close to their natural curve, pump and compressor laws instruct that compressor capacity is approximately proportional to speed, point "C" in FIG. 4 represents approximately 65% plant capacity. With four equally sized chillers, this load point could easily be served with only three chillers operating as a conventional sequencing strategy would dictate. (Three out of four chillers providing 75% capacity.) But as illustrated in FIG. 3, this operating point is much closer to the natural curve 324 which represents all four chillers in operation. Therefore, an all variable-speed LOOP plant operating according to this invention would employ all four chillers at this load point to operate more efficiently. Similarly, the operating point "D" could be served by two chillers, but as shown in FIG. 3, operating according to this sequencing invention, it would be served by three chillers for improved operating efficiency.

For many variable-speed centrifugal chillers that may be employed in a LOOP chiller plant, the following formulas can be employed for sequencing to achieve operation near the natural curves of the chillers. The logic reflected in these formulas can be programmed into virtually any modern chiller plant control system.

Adding a chiller

An additional chiller should be brought on-line whenever the average operating differential pressure (DP) across the operating compressors falls below and to the right of the natural "add/shed curve" for the current on-line chiller configuration. The logic for adding a chiller is:

$HPFA=((N/n) \times TCSF)^2 \times (n/(n+1))^{C1}$. If HPFA>HPF, then add a chiller, where:

HPFA is the calculated HPF threshold to add a chiller to the operating units.

| | |
|---|---|
| HPF | is the current value of the compressor "Head Pressure Fraction" for the on-line chillers. This fraction is a ratio of the average current compressor head pressures compared to the design maximum. If direct pressure values are not available, a formula that approximates these values can be easily developed from the refrigerant temperatures or the condensing and chilled water temperatures. |
| TCSF | is the current "Total Chiller Speed Factor" of the chiller plant expressed as a fraction. This is the sum of the percent speeds of each currently on-line chiller, divided by the total number of chillers in the plant. |
| C1 | is a constant between 0 and 2 that establishes how far between the current and an adjacent natural curve the chiller add sequence will take place. A value of 0 would add a chiller while operating on the current natural curve. A value of 2 would delay the addition until operation would be exactly on the additional chiller natural curve. |
| N | is the total number of equally sized chillers in the plant. Note that if the chillers are not equally sized, N is the common factor such that each chiller provides a certain "units" of cooling, and N is the total "units" for the plant. |
| n | is the number of equally sized chillers (or "units" of chillers) currently on-line. |

Shedding a chiller

Shedding a chiller is desired when the average operating differential pressure (DP) of the on-line chillers crosses above and to the left of the "add/shed curve" for the next lowest possible on-line chiller configuration. The logic for shedding a chiller is:

$HPFS=((N/(n-1)) \times TCSF)^2 \times ((n-1)/n)^{C2}$. If HPFS<HPF, then shed a chiller, where:

HPFS is the calculated HPF threshold to shed a chiller from the operating units.

| | |
|---|---|
| HPF | is the compressor "Head Pressure Fraction" defined above. |
| TCSF | is the current "Total Chiller Speed Factor" defined above. |
| C2 | is a constant that is between 0 and 2 which establishes how far between the current and adjacent natural curve the chiller shed sequence will take place. A value of 2 would shed a chiller while operating on the current natural curve. A value of 0 would delay the chiller shed until operation were exactly on the natural curve of the plant operating with one less chiller. |
| N | is the total number of equally sized chillers (or chiller "units") in the plant as defined above. |
| n | is the number of equally sized chillers (or "units" of chillers) currently on-line. |

For stable operation C1 must always be greater than C2. Since centrifugal pumps and fans are subject to the same fan and pump law as centrifugal compressors on chillers, these formulas are suitable for sequencing multiple parallel connected fans and pumps also.

Typical chiller sequencing flow chart for a plant employing this natural curve sequencing method is shown in FIG. 4. Referring now to FIG. 4, the control sequence begins in the upper left corner at "Start" with a check whether the chiller plant operation is needed at all 400. If not, a chiller plant shutdown sequence (not shown) is initiated 402, and control returns to a delay step 410 having a duration of, for example, one minute to avoid instability or oscillation. If the chiller plant is needed, test 404 whether or not it is currently operating. If not, a chiller plant startup sequence is initiated 406 and again control loops to delay step 410. After the delay 410, the sequence repeats at the start (400).

If the plant is needed and currently operating, a first head pressure threshold value HPFA, that is, the head pressure fraction value to add a chiller, is calculated using a formula generally of the form shown above, responsive to the number of chillers on-line currently (n), the total number of chillers available (N), and the TCSF indicative of current operating speeds. As noted above, C1 is a constant that is between 0 and 2 which establishes how far between the current and adjacent natural curve the chiller add sequence will take place. A value of 0 would add a chiller while operating on the current natural curve. A value of 2 would delay the addition until operation would be exactly on the additional chiller natural curve. Thus C1 can be adjusted to "tune" responsiveness of the system to varying conditions.

The next step 414 is to compare the current Head Pressure Fraction (HPF) to the calculated HPFA. If the HPFA is greater than the current HPF, step 416 initiates an add chiller sequence to bring another chiller on-line. Then control returns via path 418 to the delay 410. If the calculated HPFA is not greater than the current HPF, the next step 420 calls for calculating a Head Pressure Fraction for shedding a chiller. This HPFS value is calculated as shown in the figure using the formula above. Here, exponent C2 is shown for illustration as equal to 0.25. In practice it takes a value between 0 and 2 as explained earlier. Note that exponent values C1 and C2 allow the operator to separately tune the add and shed conditions.

Step 422 compares the current Head Pressure Fraction (HPF) to the calculated HPFS. If the HPFS is less than the current HPF, step 426 initiates a "shed chiller" sequence to take one chiller off line. Then control returns via path 428 to the delay step 410 at the top of the drawing. If HPFS is not less than the current HPF, control loops via path 430 to the delay 410 and thence to repeat the process beginning at 400.

It will be apparent to those having skill in the art that various changes may be made to the details of the above-described embodiment of this invention without departing from the underlying principles thereof. The scope of the present invention should, therefore, be determined only by the following claims.

What is claimed is:

1. A system comprising at least two variable speed chillers arranged in parallel, each chiller including a refrigerating cycle that includes a variable speed compressor, an evaporator, a condenser, and a refrigerant expansion device, and wherein the speed of all operating chillers is coordinated by a common controller to meet a cooling load, comprising:

means for transmitting a first control signal from each chiller to the common controller to communicate speed of the corresponding chiller;

means for transmitting a second signal from each chiller to the common controller to communicate a current head of the corresponding compressor;

the controller including first means responsive to the first control signals and the second control signals from all of the operating chillers for determining a current operating point of the system without regard to load;

the controller further including second means for selecting a specific number of chillers such that the selected number of chillers in operation at the current operating point of the system would be operating a closely as possible to their predetermined natural curve of operating efficiency; and the controller further including third means for adjusting the number of chillers on-line such that it equals the selected number of chillers, thereby improving overall operating efficiency of the system, while still enabling the system to accommodate the load by adjusting speed of the adjusted number of on-line chillers.

2. A method according to claim 1 wherein the means for adjusting the number of chillers on-line comprises a predetermined procedure for adding a chiller on-line and a predetermined procedure for shedding a chiller.

3. A system according to claim 1 wherein the means of determining the compressor head pressure for each chiller comprises a pressure sensor arranged for measuring a difference between the chiller condenser and the chiller evaporator pressures.

4. A system according to claim 1 wherein the means of determining the compressor head pressure for each chiller includes:
- means for measuring the entering and leaving condenser water temperatures;
- means for measuring the entering and leaving chilled water temperatures;
- means for determining a temperature differential between the log mean of condenser and chilled water temperatures and the refrigerant temperature;
- means for calculating the refrigerant pressure at each condition by employing a look-up table that translates the refrigerant temperature to the saturated vapor pressure for the refrigerant employed in the chiller; and
- means for calculating the head pressure by determining a difference between the condenser pressure and the evaporator pressure.

5. A system according to claim 1 wherein the means of determining the compressor speed includes means for measuring a power draw of the motor driving the compressor and means for calculating the motor speed based on the measured driving motor power draw.

6. A variable flow hydronic system comprising:
- at least two variable speed pumps, a first signal from each pump is employed to communicate speed of that pump, and a second signal from each pump is employed to read the head or differential pressure across the pump;
- a controller that operates in response to the first and second signals such that when the average pump head is a selected increment greater than an ideal pump head for the communicated speed, a pump is cycled off and the remaining pumps are operated at higher speeds as required to meet the load, and anytime the average head is a selected increment less than the ideal pump head for the current speed, an additional pump is cycled on, and all of the on-line pumps are operated at lower speeds sufficient to meet the load.

7. A system according to claim 6 for which the means of determining the pump head pressure for all pumps is a pressure sensor that measures the difference between the inlet and outlet headers for the pumping system.

8. A method of sequencing centrifugal chillers in a loop HVAC system having a plurality of variable speed drive centrifugal chillers arrange in parallel and coupled to a common distribution header comprising the steps of:
- commencing operation of the HVAC system with at least one of the chillers on-line;
- monitoring a current compressor operating speed and actual head pressure of the on-line chillers;
- determining a head pressure shedding threshold based on the current compressor operating speed;
- comparing the actual head pressure of the on-line chillers to the head pressure shedding threshold value for the current operating speed;
- if the actual head pressure of the on-line chillers is greater than the head pressure shedding threshold value for the current operating speed, shedding one of the on-line chillers;
- and then increasing the operating speed of the chillers remaining on-line, thereby improving overall operating efficiency.

9. A method according to claim 8 wherein said determining a chiller head pressure shedding threshold comprises determining a natural curve of efficient operation of the compressors.

10. A method according to claim 8 wherein the actual head pressure of the on-line chillers is determined as a ratio of an average current compressor head pressures compared to a predetermined design maximum for the chillers.

11. A method according to claim 8 further comprising monitoring refrigerant temperatures and wherein said monitoring the actual head pressure comprises estimating the actual head pressure based on the refrigerant temperatures.

12. A method according to claim 8 and further comprising monitoring condensing and chilled water temperatures, and estimating the actual head pressure based on the condensing and chilled water temperatures.

13. A method according to claim 8 wherein determining a head pressure shedding threshold value comprises calculating the shedding threshold value as a predetermined quadratic function of the operating speed.

14. A method according to claim 8 wherein the shedding threshold value is calculated according to the following formula:

Head pressure shedding threshold $HPFS = ((N/(n-1)) \times SP)^2 \times ((n-1)/n)^{C2}$ where
- N is the total number of centrifugal chillers arranged in parallel in the system;
- n is the number of chillers currently on-line;
- SP is a factor based on the current compressor operating speed; and the exponent
- c2 is a real number in a range between 0 and 2.

15. A method according to claim 14 wherein the current compressor operating speed is a nominal speed indicated by the system controller.

16. A method according to claim 14 further comprising determining the current compressor operating speed factor SP as a ratio of a sum of the speeds of all of the individual on-line compressors, divided by the total number N of centrifugal chillers available for sequencing.

17. A method according to claim 16 wherein N is in a range of 2 to 12.

18. A method of sequencing centrifugal chillers in a loop HVAC system having a plurality of variable speed drive centrifugal chillers arrange in parallel and coupled to a common distribution header comprising the steps of:
- commencing operation of the HVAC system with at least one of the chillers on-line;
- monitoring compressor operating speed and actual head pressure of the on-line chillers;
- selecting a head pressure adding threshold value based on the current operating speed;
- comparing the actual head pressure of the on-line chillers to the head pressure adding threshold for the current operating speed; and
- if the actual head pressure of the on-line chillers is greater than the selected head pressure adding threshold value for the current operating speed, adding another one of the chillers on-line;
- and then reducing the operating speed of all of the on-line chillers, thereby improving overall operating efficiency of the system.

19. A method according to claim 18 wherein said determining a chiller head pressure adding threshold comprises determining a natural curve of efficient operation of the compressors.

20. A method according to claim 18 wherein the actual head pressure of the on-line chillers is determined as a ratio of the average current compressor head pressures compared to a predetermined design maximum for the chillers.

21. A method according to claim 18 further comprising monitoring refrigerant temperatures and wherein said monitoring the actual head pressure comprises estimating the actual head pressure based on the refrigerant temperatures.

22. A method according to claim 18 and further comprising monitoring condensing and chilled water temperatures, and estimating the actual head pressure based on the condensing and chilled water temperatures.

23. A method according to claim 18 wherein selecting a head pressure adding threshold value HPFA comprises calculating the HPFA value as a predetermined quadratic function of the current operating speed.

24. A method according to claim 18 wherein the HPFA is calculated according to the following formula:

$HPFA = ((N/n) \times SP)^2 \times (n/(n+1))^{C2}$ where

N is the total number of centrifugal chillers arranged in parallel in the system;

n is the number of chillers currently on-line;

SP is the current compressor operating speed; and the exponent c2 is a real number in a range between 0 and 2.

25. A method according to claim 24 wherein the current compressor operating speed is a nominal speed indicated by the system controller.

26. A method according to claim 24 further comprising determining the current compressor operating speed SP as a ratio of a sum of the speeds of all of the individual on-line compressors, divided by N—the total number of centrifugal chillers available for sequencing.

27. A method according to claim 24 wherein c2 has a value greater than 1.

28. A method of sequencing centrifugal pumps in a variable flow hydronic system having a plurality of variable speed drive centrifugal pumps arranged in parallel and coupled to a common distribution header to circulate chilled or heating water, the method comprising the steps of:

commencing operation of the hydronic system with at least one of the pumps on-line;

monitoring operating speed and actual head pressure of the on-line pumps;

selecting a desired head pressure threshold HPT value based on the current operating speed;

comparing the actual head pressure of the on-line pumps to the head pressure threshold HPT for the current operating speed; and if the actual head pressure of the on-line pumps is greater than the head pressure threshold HPT for the current operating speed, shedding one of the on-line pumps, and then increasing the operating speed of the pumps remaining on-line, thereby improving overall operating efficiency of the system.

29. A method according to claim 28 further comprising: if the actual head pressure of the on-line pumps is less than a head pressure threshold HPFA for the current operating speed, adding one more pump on-line, and then decreasing the operating speed of the operating pumps, thereby improving overall operating efficiency of the system.

* * * * *